United States Patent [19]

Okamoto et al.

[11] Patent Number: 4,505,111

[45] Date of Patent: Mar. 19, 1985

[54] HYDRAULIC CONTROL SYSTEM FOR INDUSTRIAL VEHICLE

[75] Inventors: Masaya Okamoto; Shigeru Terada, both of Tokyo, Japan

[73] Assignee: Nissan Motor Company, Limited, Yokohama, Japan

[21] Appl. No.: 399,339

[22] Filed: Jul. 19, 1982

[30] Foreign Application Priority Data

Jul. 29, 1981 [JP] Japan ................................ 56-117825

[51] Int. Cl.³ ................................................ F16D 31/00

[52] U.S. Cl. ........................................... 60/431; 60/911

[58] Field of Search ................. 60/431, 422, 427, 445, 60/911, 390; 91/513, 358 R, 358 A, 359, 459; 180/333; 137/625.64

[56] References Cited

U.S. PATENT DOCUMENTS

| | | | |
|---|---|---|---|
| 2,565,293 | 8/1951 | Aydelott et al. | 180/333 |
| 3,911,677 | 10/1975 | Collins | 60/911 |
| 4,102,132 | 7/1978 | Palmer | 60/911 |
| 4,144,946 | 3/1979 | Melocik | 60/422 |

FOREIGN PATENT DOCUMENTS

| | | |
|---|---|---|
| 2318872 | 10/1973 | Fed. Rep. of Germany . |
| 338580 | 11/1930 | United Kingdom . |
| 555710 | 9/1943 | United Kingdom . |
| 919806 | 2/1963 | United Kingdom . |
| 993390 | 5/1965 | United Kingdom . |
| 1526730 | 9/1978 | United Kingdom . |

*Primary Examiner*—Robert E. Garrett

*Assistant Examiner*—John M. Husar

*Attorney, Agent, or Firm*—Lane, Aitken and Kananen

[57] ABSTRACT

The rotational speed of a hydraulic pump motor for a fork lift hydraulic control system is varied basically in accordance with the displacement of spools of manual control valves to allow the pressure supplied to servo cylinders to be smoothly increased. The rotational speed may also be varied in response to additional parameters such as the load to be moved by the servo cylinders, the amount of displacement of the load and the rate at which the spools of the manual control valves are moved to provide improved start free safe load handling characteristics.

3 Claims, 16 Drawing Figures

HYDRAULIC CONTROL SYSTEM FOR INDUSTRIAL VEHICLE

BACKGROUND OF THE INVENTION

1. Field of the Invention

The present invention relates generally to industrial vehicles and more specifically to a hydraulic control system for a fork lift truck or similar industrial vehicle.

2. Description of the Prior Art

FIG. 1 of the drawings shows a previously proposed hydraulic control circuit 1 for controlling the lifting and tilting of cargo carried on the forks of a fork lift truck (not shown). In this arrangement an electric motor 2 is used to drive a hydraulic pump 3 which supplies hydraulic pressure to manually operated control valves 4 and 5. Located upstream of the control valves is a pressure relief valve 6 which discharges any excess pressure that prevails within the delivery circuit 7. The control valve 4 is adapted to control the pressurization of mast tilt cylinders 8 while the control valve 5 is adapted to selectively pressurize the cylinder 9 via which the forks are raised and lowered on the mast. To conserve the batteries 10, microswitches 12 and 13 are provided and incorporated into an electric circuit 11 which energizes the electric motor 2 only when either of the plungers or spools 14 and 15 of the control valves 4 and 5 are moved away from their illustrated home positions in a manner to pressurize a servo cylinder or cylinders.

In this arrangement, to eliminate the shock which is prone to occur when either of the valves is moved from or returned to its home position, each of the manual control valves is provided with a neutral port N which functions to by-pass the flow of pressurized hydraulic fluid from the pump into a drain circuit 16.

However, this arrangement has still suffered from the drawback that the speed at which the forks are elevated or the mast tilted can not be manually varied as after only a slight movement of either of the plungers from their home positions in a direction to pressurize a cylinder or cylinders, pump pressure is freely supplied to the cylinders. Thus, the cylinders tend to move the forks or tilt the mast with a start which of course is highly undesirable from the view point of safely handling cargo (such as hazardous liquids, fragile goods etc.).

SUMMARY OF THE INVENTION

The present invention features an arrangement wherein the speed of the pump motor is controlled basically in accordance with the displacement of the spools or plungers of the manual control valves to allow the pressure supplied to the servo cylinders to gradually increase and eliminate the sudden start encountered with the prior art. The speed of the motor may be further advantageously controlled in accordance with various other parameters such as the rate at which the control handles are moved, the amount by which the load has been lifted, and the weight of the load being handled.

BRIEF DESCRIPTION OF THE DRAWINGS

The features and advantages of the arrangement of the present invention will become more clearly appreciated from the following description taken in conjunction with the accompanying drawings in which.

DETAILED DESCRIPTION OF THE PREFERRED EMBODIMENTS

Figure 1:
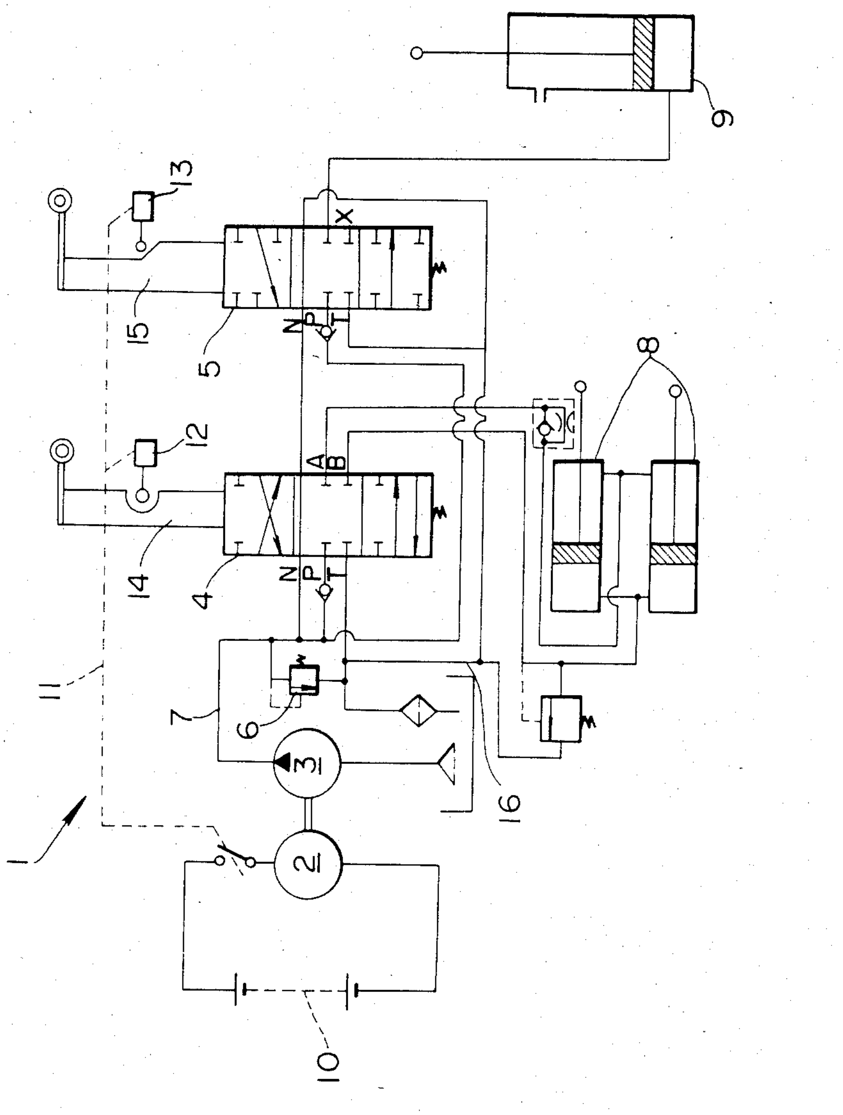
FIG. 1 PRIOR ART
FIG. 1 is a schematic illustration of a prior art fork lift hydraulic control circuit discussed in the opening paragraphs of this disclosure.
Figure 2:
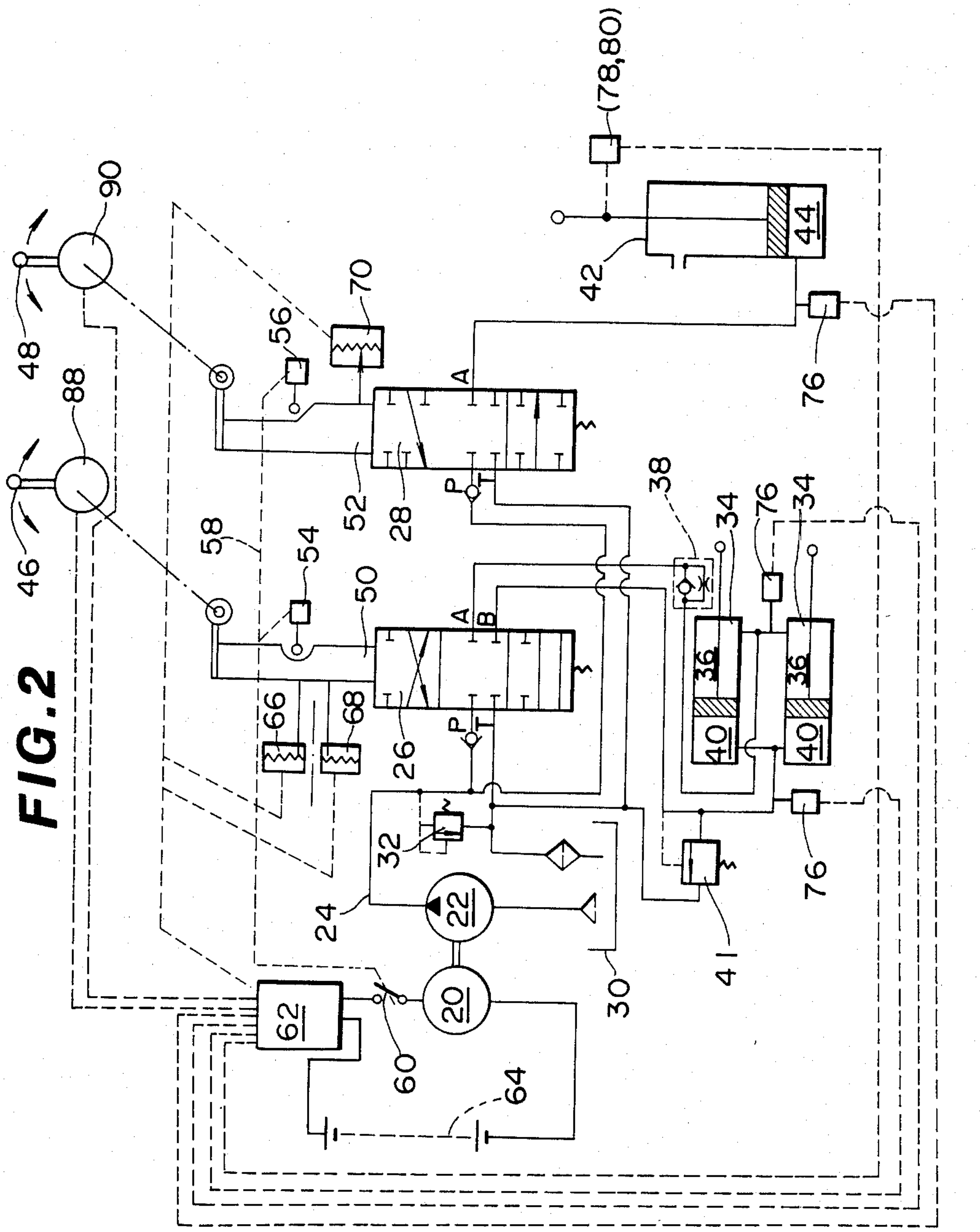
FIG. 2 is a view similar to that of FIG. 1 but showing an embodiment of the present invention.

Turning now to FIG. 2, an embodiment of the present invention is shown. In this arrangement an electric motor 20 is connected to a hydraulic pump 22 for driving same. The hydraulic fluid discharged by the pump 22 is fed through a supply circuit 24 to two manually controlled valves 26 and 28. These valve may be the same as those used in the prior art arrangement shown in FIG. 1 but with the exception that neutral ports N are closed off and not communicated with any hydraulic circuit. The pump 22 fluidly communicates with a sump 30 from which it inducts hydraulic fluid. Interposed between the supply circuit 24 and the sump 30 is a pressure relief valve 32 which functions to limit the pressure which may prevail in the supply circuit. As shown the supply circuit 24 is connected to supply ports P of each of the control valves while the drain circuit is connected to drain ports T. A pair of mast tilt cylinders 34 are connected to the control valve 26 through ports A and B. As illustrated, the chambers 36 of the cylinders 34 communicate with port A through a one-way flow restriction 38. The corresponding opposite chambers 40 fluidly communicate with port B via a pressure relief valve 41. The cylinders 34 are connected to the mast (not shown) for tilting same so that when the chambers 40 are pressurized the mast is tilted forward while when the chambers 36 are pressurized the mast is tilted rearwardly. As will be appreciated, rearward tilting can be safely carried out more rapidly than forward tilting. Hence a one-way flow restriction is not necessary in the circuit interconnecting port B and the chambers 40.

A fork elevating or lift cylinder 42 is fluidly communicated with a port A of the manual control valve 28. The equivalent of port B in this valve is closed off as the weight of the forks and/or load thereon is sufficient to pump the fluid in the chamber 44 back to the sump 30 via port T upon communication being established therebetween.

Manual control levers 46 and 48 are operatively connected to the plungers or spools 50 and 52 of the control valves 26 and 28 respectively. In this arrangement it is preferable that the levers be connected to the spools or plungers through a mechanism which induces a full stroke of the spool in one direction away from its home position (for example 7 mm) in response to approximately a 10 cm displacement of a control lever.

Figure 6:
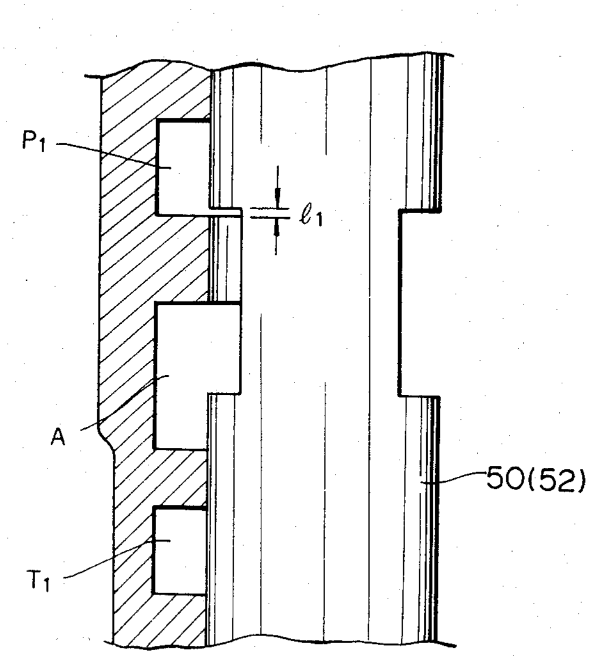
FIG. 6 is an enlarged view of the portion of the manual control valve contained in the circle VI of FIG. 5.

To sense the spools having been moved from their home positions, microswitches 54 and 56 are provided. These switches are incorporated into a circuit 58 which closes a switch 60 and energizes the electric pump motor 20 upon the spools being appropriately displaced. As shown, the microswitch 54 will be triggered upon movement of the spool or plunger 50 in either direction from its home position while the spool or plunger 52 of the control valve 28 is adapted to trigger the microswitch 56 only when the spool is moved in a direction to pressurize the chamber 44 of the lift cylinder 42. In this embodiment it is also preferred (but not essential) that the spools be adapted so that until an overlap of $l_1$ (for example 1–1.5 mm) such as shown in FIG. 6, has occurred between ports, the microswitches will not be triggered. This permits a restricted communication to occur between the ports $A_1$ and $P_1$ (for example) which allows for communication to be partially established between the supply circuit 24 and the chamber to be pressurized (for example, chambers 36) before the pump 22 actually supplies pressurized fluid. This is deemed advantageous for smoothing the operation of the servo cylinders.

To control the speed of the pump motor 20 and thus the pressure produced by the pump 22, a control unit 62 is circuited between the batteries 64 and the switch 60 controlled by the microswitches 54, 56. This control unit 62 receives input signals from variable rheostats or potentiometers 66, 68, 70 which sense the degree of displacement of the spools or plungers from their home positions. In the case of the control valve 28 only a single rheostat 70 is necessary while two rheostats 66, 68 are connected to sense the displacement of the spool 50. The rheostat 66 senses the movement which induces forward tilt while the rheostat 68 senses the movement which induces rearward tilt. As will be appreciated, the connection between these rheostats is such that once the plunger is moved in one direction from the home position, only one of the rheostats produces an output while the other is rendered inactive.

Figure 7:
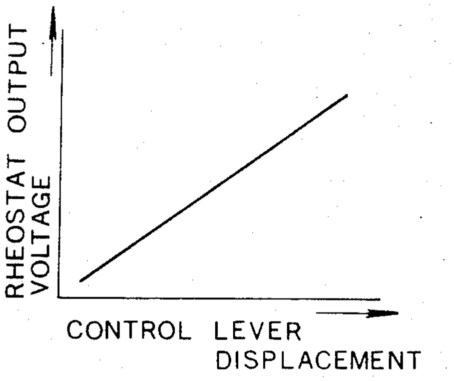
FIG. 7 is a graph showing in terms of manual control lever displacement and voltage, the output characteristics of the rheostats used to sense the displacement of the manual control valve spools.

FIG. 7 shows in terms of rheostat output voltage and manual control lever displacement, a typical output characteristic of the aforedisclosed rheostats. However, in order to achieve a desirable variation between lift, forward and rearward tilting operations, the output characteristics of the rheostats may be different (viz., the gradient of the straight line plot may be increased or decreased). This is particularly so in the case of rheostat 70 which influences the lifting operation wherein it is preferable to increase the gradient.

Figure 8:
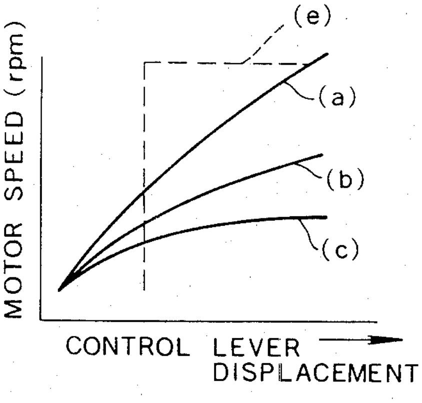
FIG. 8 is a graph showing in terms of control lever displacement and engine RPM, the lifting, forward and rearward tilting characteristics provided by the basic arrangement of the present invention.

Accordingly, as the control unit 62 is arranged to control the voltage outputted to the pump motor 20 in accordance with the outputs of the variable rheostats (whereby the RPM of the motor is gradually increased), the freight or cargo handling characteristics such as shown in FIG. 8 are produced. In this figure, curve (a) indicates the lifting characteristics, curves (b) and (c) indicate the rearward and forward tilting characteristics respectively, and for the sake of comparison, curve (e) shows the characteristics provided by the prior art. As will be noted, the lifting rate is higher than the rearward tilting due to the long stroke involved while the forward tilting rate is minimized to avoid spillage.

This basic control alone is sufficient to induce smooth lifting and tilting movement of the forks and mast; however, to further supplement this control, it is deemed advantageous to sense one or more parameters and further modify the output of the control unit in accordance therewith as will become clear hereinlater.

Figure 3:
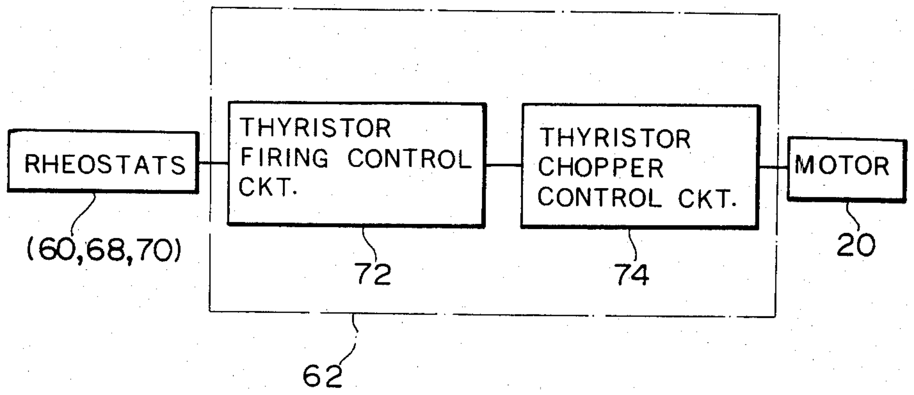
FIG. 3 is a block diagram of an example of circuitry which may be utilized in the control unit of the embodiment shown in FIG. 2.
Figure 4:
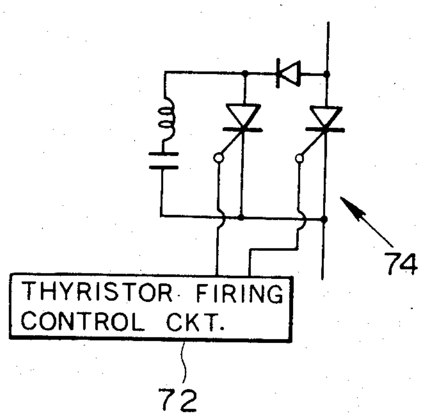
FIG. 4 is a circuit diagram showing a portion of the circuitry of FIG. 3 in detail.
Figure 5:
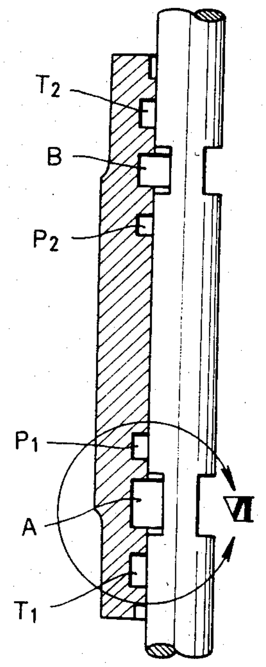
FIG. 5 is a sectional view of a portion of a manually controlled valve utilized in the arrangement of FIG. 2.

FIG. 3 shows in block diagram form, a possible circuit arrangement suitable for use in the control unit for processing the inputs from the variable rheostats 60, 68, 70. In this arrangement, the control circuit takes the form of a thyristor firing control circuit 72 and a thyristor chopper control circuit 74. As shown the thyristor firing control circuit 72 is connected to the variable rheostats (66–70) while the thyristor chopper control circuit 74 is connected to the motor 20. FIG. 4 shows in detail a possible construction of the chopper circuit 74.

However, it should be noted that the control circuit is not limited to the just described examples and may include other circuits including a microcomputer or the like so as to facilitate the processing of a plurality of inputs from various other sensors which may be preferably provided to supplement the variable rheostats.

A first of the additional parameters that may be advantageously sensed in addition to the actual displacement of the spools is the weight or load being handled by the fork lift. This may be advantageously determined by sensing the hydraulic pressure fed to the chambers of the cylinders. To do this, pressure/voltage transducers 76 are connected as shown and each adapted to produce a voltage indicative of the weight of the freight on the forks which the servo cylinders must overcome.

Figure 9:
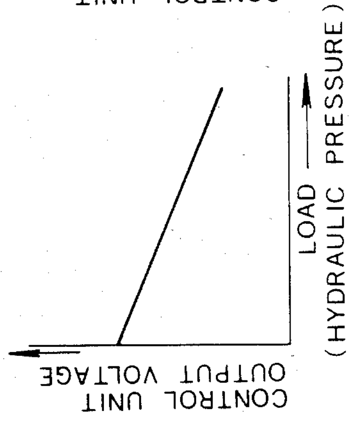
FIG. 9 is a graph showing in terms of voltage fed to the electric pump motor and the load being lifted, the control characteristics provided by sensing the hydraulic pressure being fed to the hydraulic cylinders and controlling the speed of the pump motor in accordance therewith.
Figure 12:
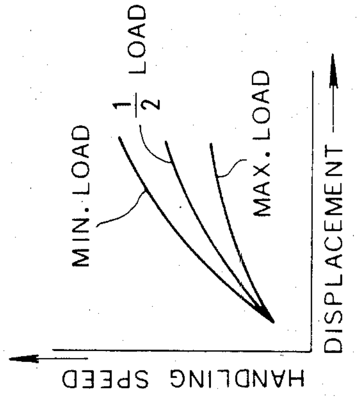
FIGS. 12, 13 and 14 are graphs showing, in terms of fork or mast displacement and the speed at which said forks or mast are moved, the freight handling characteristics produced respectively by controlling the pump with a voltage which varies in a manner as shown in FIGS. 9, 10 and 11.

FIG. 9 is a graph showing the control unit output voltage as a function of the sensed load while FIG. 12 shows the handling characteristics which may be obtained by controlling the motor in this manner. As shown in FIG. 12, when the load is approximately the maximum that the truck is designed to lift, the rate at which the speed of the forks or mast is varied as a function of displacement is minimized, while at lower loads, the rate is accordingly increased.

Figure 10:
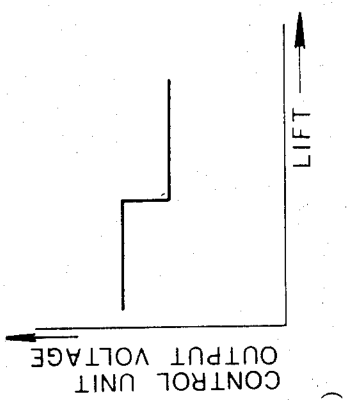
FIG. 10 is a graph showing in terms of voltage fed to the pump motor and the degree by which the load has been lifted, the control characteristics provided by sensing the position of the forks on the mast and controlling the speed of the motor in accordance therewith.
Figure 13:
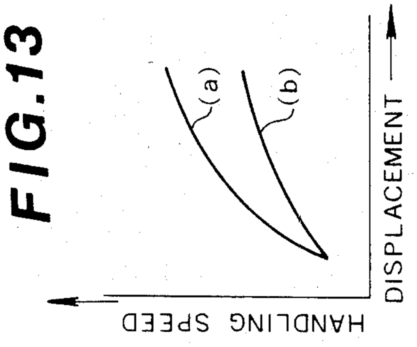
Figure 15:
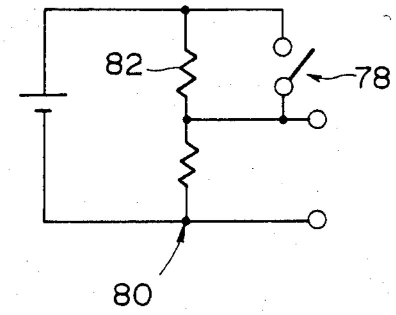
FIG. 15 is a diagram showing a possible circuit arrangement by which the position of the forks on the mast may be sensed.
Figure 16:
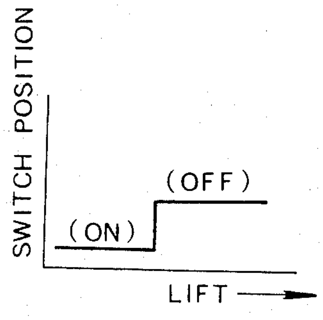
FIG. 16 is a graph showing the position of the switch shown in FIG. 15.

A second additional parameter which may be sensed takes the form of the position of the forks on the mast. To sense the position or height of the forks on the mast, it is possible to utilize a circuit such as shown in FIG. 15 wherein a microswitch 78 or the like is adapted to be triggered once the forks reach a predetermined position. As shown, this circuit takes the form of a voltage driver 80 wherein the resistor 82 is adapted to be short circuited once the switch 78 is closed. FIG. 16 shows the switch position with respect to the position of the forks on the mast, while FIG. 10 shows the voltage outputted by the control unit in response to the sensed position of the forks on the mast. As shown, the voltage decreases stepwisely; however, the handling characteristics obtained are smooth as indicated by the curves in FIG. 13. In this figure (FIG. 13) the curve (a) indicates the rate at which the forks are moved before they reach the aforementioned predetermined height, while curve (b) indicates the rate obtained after the microswitch 78 is triggered.

Figure 11:
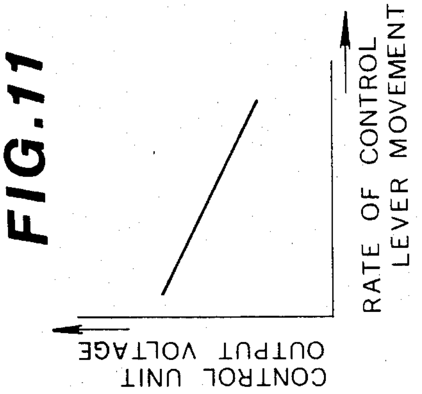
FIG. 11 is a graph showing the control characteristics provided by sensing the rate at which a manually operable lever or levers are moved and controlling the voltage fed to the pump motor in accordance therewith.
Figure 14:
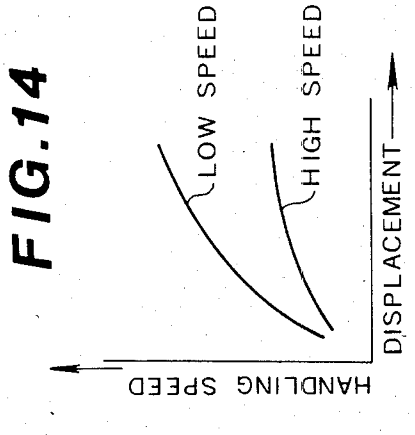

Another parameter which can be advantageously sensed is the rate at which the manual control levers 46, 48 are moved. To do this, it is possible to connect tachogenerators 88, 90 to the axles of the levers or the like and sense the rate of rotation of same. FIG. 11 shows the output voltage of the control unit as a function of the sensed rate of rotation of the levers. As shown in this figure, the voltage decreases as the rate of rotation increases, whereby freight handling characteristics such as shown in FIG. 14 are obtained. As shown in FIG. 14, when the levers 84, 86 are rotated rapidly, the pump motor 20 is energized in a manner to relatively slowly increase the RPM thereof, thus buffering any tendency for a jerk or start to be produced.

From the foregoing, it will be appreciated that in combination with the basic control provided by the rheostats with one or more of the secondary parameters, excellent lifting and handling characteristics may be obtained whereby spillage or damage to freight or cargo can be minimized and/or completely eliminated.

What is claimed is:

1. A hydraulic control system for an industrial vehicle or the like comprising:
   - a hydraulic pump providing a supply of hydraulic fluid;
   - a variable speed motor for driving said pump;
   - a source of motive power;
   - a first control valve for controlling the supply of hydraulic fluid under pressure from said pump to a first hydraulic servo cylinder means, said first control valve being connected with said pump for continuously receiving hydraulic fluid under pressure from said pump;
   - a second control valve for controlling the supply of fluid under pressure from said pump to a second hydraulic servo cylinder means, said second control valve being in constant fluid communication with said pump for receiving the hydraulic fluid under pressure from said pump;
   - a first switch responsive to said first valve opening by a predetermined small amount;
   - a second switch responsive to said second valve opening by said predetermined small amount;
   - a motor energization switch responsive to said first and second switches for connecting said motor with said source of motive power upon either of said first and second valves being opened to said predetermined small amount;
   - a first pressure/voltage transducer for sensing the load applied to said first hydraulic servo cylinder means;
   - a second pressure/voltage transducer for sensing the load applied to said second hydraulic servo cylinder means;
   - a first variable rheostat operatively connected with said first valve for sensing the degree by which said valve is opened;
   - a second variable rheostat connected with said second valve for sensing the degree by which said second valve is opened;
   - a control circuit operatively connected with and responsive to said first and second variable rheostats and said first and second pressure/voltage transducers for controlling the speed of said motor;
   - first and second manually operable members operatively connected with said first and second valves, respectively; and
   - first and second tachogenerators mechanically connected with said first and second manually operable members, respectively;
   - said first and second tachogenerators outputting signals indicative of the rate at which said first and second valves are opened;
   - said control circuit being responsive to the signals outputted by said first and second tachogenerators for varying the speed of said motor in response to the rate of movement of said first and second manually operable members.

2. A hydraulic control system as claimed in claim 1, further comprising a third switch operatively connected with said second hydraulic servo cylinder means for sensing said second hydraulic servo cylinder means having displaced the load applied thereto through a predetermined distance and outputting a signal indicative thereof, said control circuit being arranged to change the speed of said motor in response to the output of said third switch.

3. A hydraulic control system as claimed in claim 2, further comprising a voltage divider operatively connected with said third switch, said voltage divider having first and second resistors one of which is arranged to be short circuited by said third switch upon said load being displaced through said predetermined distance.

* * * * *